United States Patent [19]

Thordarson

[11] Patent Number: 4,503,775
[45] Date of Patent: Mar. 12, 1985

[54] ELECTROMAGNETIC PROXIMITY FUSE

[75] Inventor: Gunnar G. Thordarson, Järfälla, Sweden

[73] Assignee: U.S. Philips Corporation, New York, N.Y.

[21] Appl. No.: 478,925

[22] Filed: Mar. 25, 1983

[30] Foreign Application Priority Data

Apr. 6, 1982 [SE] Sweden ............................. 8202181

[51] Int. Cl.$^3$ ............................................. F42C 13/04
[52] U.S. Cl. ................................................... 102/214
[58] Field of Search ..................... 102/214; 343/7 PF

[56] References Cited

U.S. PATENT DOCUMENTS 4,192,235 3/1980 Jacomini ............................ 102/214
4,205,316 5/1980 Peperone ........................... 102/214
4,232,609 11/1980 Held .................................. 102/214

Primary Examiner—Charles T. Jordan
Attorney, Agent, or Firm—Robert J. Kraus

[57] ABSTRACT

An electromagnetic proximity fuse system operating by transmitting an electromagnetic wave and which is reflected by an object. The reflected wave is combined with the transmitted wave to produce a doppler signal, which is used to trigger an ignition circuit. The doppler signal $U_1$ is applied to an analog divider (12) together with a delayed version of the doppler signal $U_2$. The analog divider (12) delivers an output signal of doppler frequency ($f_d$), the amplitude of which is equal to the quotient $U_1/U_2$. This output signal is applied to a filter (15), which has a frequency characteristic approximately equal to $1/(f_o+f)$, where $f_o$ is a system parameter and f is the frequency ($f_d$). The output signal from the filter (15) is applied to an ignition circuit (17) via a threshold circuit (16) having a fixed threshold at which the ignition circuit (17) is to be triggered. The ignition circuit (17) will be triggered at a constant distance from the reflecting object independently of such unknown variables as the approaching speed, the reflection factor of the object and the gain factor of the system.

6 Claims, 8 Drawing Figures

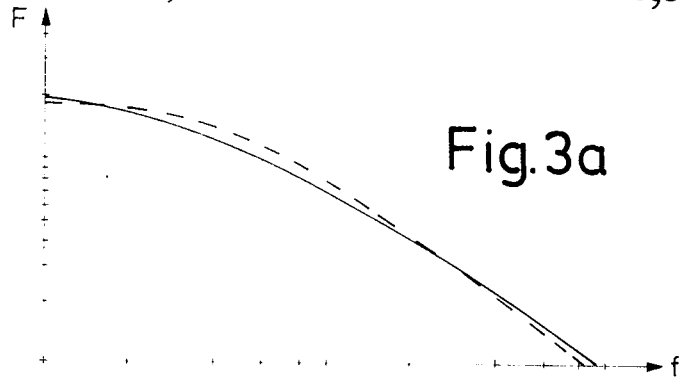
Fig.3a
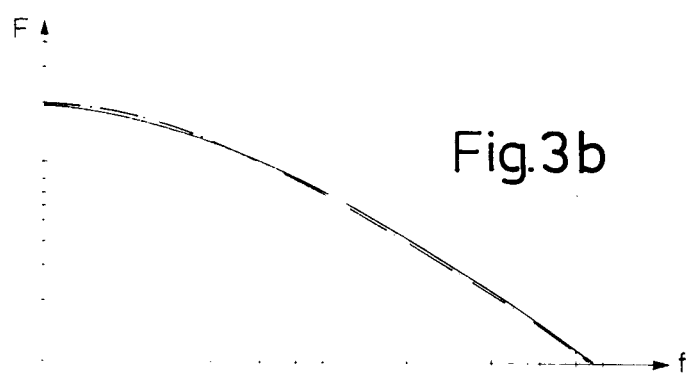
Fig.3b
Fig.4
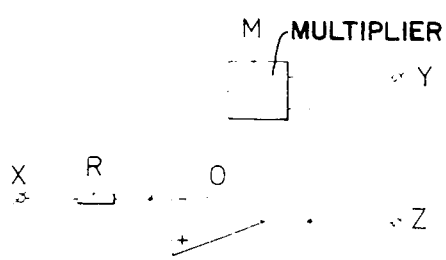
Fig.5a
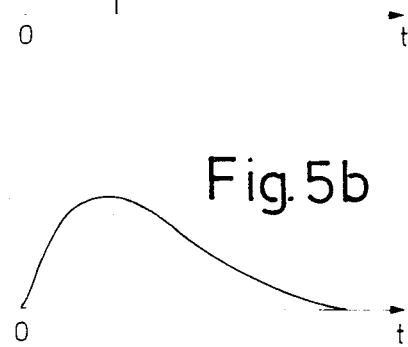
Fig.5b

ELECTROMAGNETIC PROXIMITY FUSE

BACKGROUND OF THE INVENTION

The invention relates to a proximity fuse for projectiles, missiles or the like comprising means for transmission of an electromagnetic wave and reception of an electromagnetic wave, which is re-transmitted after reflection from an object. The re-transmitted wave is combined with the transmitted one for generation of a doppler signal, which is fed to an ignition circuit via a signal processing circuit, in which the dynamic variation of the doppler signal is determined by comparing the prevailing value of the doppler signal with the value of the doppler signal a given time interval previously.

Such a proximity fuse is known from U.S. Pat. No. 4,192,235, where the signal processing circuit consists of an automatic gain control circuit for a receiver amplifier comprising a delay filter connected in the feed-back loop. Because the gain control takes place with time delay from the output of the amplifier, this circuit will produce an output signal which is an approximative value for the quotient of the prevailing value of the amplitude of the doppler signal divided by its amplitude a given time interval previously. This quotient varies in a characteristic manner with the distance to the reflecting object and can consequently be used for initiating the ignition circuit at a desired distance from the object. The dynamic variation of this quotient is, however, dependent upon the approaching speed of the projectile toward the object and in order to be able to initiate the ignition circuit at a desired distance it is consequently necessary to know this approaching speed. Furthermore, the automatic gain control circuit in the known device gives only an approximative value of the quotient between the amplitude of the prevailing doppler signal and its amplitude said given time interval previously. The accuracy of the appoximation depends i.a. on the time constant in the control circuit in relation to the dynamic behaviour of the doppler signal, which in turn is dependent upon the approaching speed.

The known circuit therefore operates in principle only for one single approaching speed in its desired function to give a constant distance of burst. It is assumed in the patent specification that this approaching speed is constant and known.

SUMMARY OF THE INVENTION

It is an object of the invention to provide a signal processing circuit for a proximity fuse of the kind described in the preamble, which produces a more accurate distance indicating function than the known circuit without knowing the approaching speed, and which will result in a constant, desired distance of burst independently of the approaching speed.

According to the invention the signal processing circuit comprises a divider, which at one input receives the doppler signal and at a second input receives a delayed version of the doppler signal. The divider delivers a doppler frequency signal, the amplitude of which corresponds to the quotient between the prevailing value of the amplitude of the doppler signal and the amplitude of the delayed version of the doppler signal. The doppler frequency signal is fed to the ignition circuit via a filter, which at least approximately has a frequency characteristic which can be represented by the expression:

$$1/(f_o + f)$$

where $f_o$ is a system parameter and $f$ is the frequency of the input signal. Thus the doppler frequency signal has a frequency to the frequency $f_d$ of the doppler signal. Triggering of the ignition circuit takes place when the output signal of the filter exceeds a certain level. The constant $f_o$ is so dimensioned in combination with the triggering level that the ignition circuit will be triggered at a given distance from the reflecting object.

By feeding the doppler signal and the delayed version of the doppler signal to two different inputs of an analogue divider, an exact measurement of the quotient between the prevailing value of the amplitude of the doppler signal and its amplitude a given time interval previously is obtained in a simple manner. The quotient varies with the distance to the reflecting object according to a theoretically known function containing the approaching speed toward the target. By thereafter feeding the output signal of the divider to the ignition circuit via a filter having the mentioned frequency characteristic, the effect of different approaching speeds will be compensated for and burst will be initiated at a given distance independently of the approaching speed, if the ignition circuit is triggered when the output signal of the filter exceeds a given, fixed threshold level.

A simple circuit for attaining the desired frequency characteristic is a circuit comprising a low-pass RC filter. This results in a very good approximation of the desired filter characteristic within a given frequency band.

A better approximation of the desired frequency characteristic is obtained by using an RC-filter of second order. With suitable dimensioning such a filter can obtain almost exact conformity between the actual filter characteristic and the theoretically correct characteristic, within a given frequency band.

It is advantageous to produce the delayed version of the doppler signal by means of a simple linear filter of low-pass or band-pass type preceeded by an envelope detector for the doppler signal. The advantage of using such a filter instead of a pure delay line is that the obtained signal will represent a smoothed mean value of the signal during a foregoing time interval, whereby instaneous disturbances in the doppler signal will not have any influence of the distance indicating quotient signal from the analogue divider.

BRIEF DESCRIPTION OF THE DRAWING

Embodiments of the invention are illustrated in the accompanying drawing, in which:

FIGS. 3a and 3b show the frequency characteristic for the filters according to FIGS. 2a and 2b together with the theoretically correct characteristic;

FIG. 4 shows an embodiment of an analogue divider which is included in the circuit shown in FIG. 1; and FIGS. 5a and 5b show two pulse responses for a delay network included in the circuit according to FIG. 1.

DESCRIPTION OF THE PREFERRED EMBODIMENTS

Figure 1:
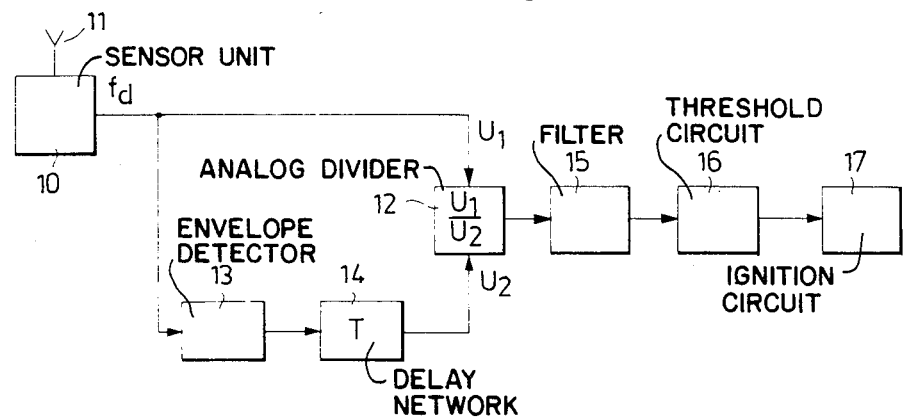
FIG. 1 shows a simplified block diagram for the electric signal processing circuit in a proximity fuse according to the invention.

In FIG. 1 reference numeral 10 designates a sensor unit comprising a HF-oscillator for generating a HF-signal and 11 is an antenna for transmission of the HF-signal and reception of a reflected signal after reflection from an object. In the sensor unit the transmitted and the received HF-signals are combined for generating a doppler signal of doppler frequency $f_d$, which forms the output signal of the sensor unit and is used to initiate burst at a desired distance from the reflecting object.

According to the invention the doppler signal from the sensor unit is applied to one input of an analogue divider 12, which at a second input receives a delayed version of the envelope of the doppler signal generated by an envelope detector 13 and a delay network 14. The analogue divider supplies a signal which is equal to the quotient between the signal on the first input and the signal on the second input. A signal of doppler frequency is obtained from the divider 12, the amplitude of which is equal to the prevailing amplitude of the doppler signal $U_1$ divided by its amplitude $U_2$ a given time interval previously. This output signal from the divider 12 is passed through a filter 15 having an accurately determined frequency characteristic, as will be explained in more detail, to a threshold circuit 16, the output signal of which is used to initiate an ignition circuit 17. The threshold circuit 16 has a fixed threshold and the ignition circuit 17 is initiated at a given level of the output signal of the filter 15 determined by the fixed threshold in the threshold circuit. The parameters in the circuit and in particular the frequency characteristic of the filter in combination with the fixed threshold in the threshold circuit 16 are selected so that triggering of the ignition circuit takes place at a constant, desired burst height above the ground, which in the present case is the reflecting object.

The invention is based upon the following theoretical discussion:

For a CW doppler system the following relationship exists:

$$U = (k/H) \quad (1)$$

where
- U = the amplitude of the detected doppler signal,
- H = the height of the proximity fuse above the ground, and
- k = a constant which depends on
  - (a) the reflection factor of the ground
  - (b) the sensitivity of the FF system and the detector
  - (c) the antenna gain of the proximity fuse.

This means that the detected amplitude U at a given height is dependent upon both the reflection from the ground and the properties of the proximity fuse. In order to obtain an accurately determined burst height by means of the CW doppler system, the constant k must be known. This could be achieved by determining k as accurately as possible before firing the projectile on which the proximity fuse is mounted, and thereafter setting a suitable threshold level for the amplitude U in the proximity fuse. Account then must be taken of the sensitivity of the proximity fuse on the actual projectile and the reflection factor of the ground in the target area.

An alternative manner to obtain a constant height of burst is to determine the constant k from the dynamic behaviour of the signal, when the proximity fuse approaches the ground.

If $U_1$ designates the amplitude of the doppler signal at the height h and $U_2$ designates the amplitude at the height (h+x) then according to the relationship (1) the following is valid:

$$U_1 = \frac{k}{h} \quad (2)$$

$$U_2 = \frac{k}{h+x} \quad (3)$$

By dividing the relationship (2) with (3) the following is obtained $$\frac{U_1}{U_2} = \frac{h+x}{h} \quad (4)$$

The height difference x in the equation (3) corresponds to a time delay T according to the relationship:

$$x = v \cdot T \quad (5)$$

where v = the vertical speed of the projectile.

By inserting the desired height of burst $H_o$ and a suitable value for the time constant T in the relationship (4) the following conditon can be obtained for the triggering of the ignition circuit of the proximity fuse:

$$\frac{U_1}{U_2} \cong \frac{H_o + vT}{H_o}, \quad (6)$$

A condition for the useability of the above relationship for triggering the ignition circuit is that the vertical speed v is known, or that compensation be made for a varying v.

For the CW doppler system the following is valid $$v = \tfrac{1}{2} \cdot \lambda \cdot f_d \quad (7)$$

where $\lambda$ = the wavelength of the transmitter of the proximity fuse and
$f_d$ = the detected doppler frequency.

A varying vertical speed v can be compensated for by making the triggering condition dependent on the magnitude $f_d$, which is easy to measure in the proximity fuse.

This can be effected in the following manner:

From the equations (6) and (7) the following is obtained:

$$\frac{U_1}{U_2} \cong \frac{H_o + \tfrac{1}{2}\lambda f_d T}{H_o} = \frac{T \cdot \lambda(H_o \cdot \frac{2}{\lambda T} + f_d)}{H_o} \quad (8)$$

or $$\frac{U_1}{U_2} \cdot \frac{1}{H_o \cdot \frac{2}{\lambda T} + f_d} \cong \frac{\lambda T}{2 \cdot H_o} \quad (9)$$

In the relationship (9) $U_1$ is as previously mentioned the amplitude of the doppler signal at the prevailing height h, while $U_2$ is the corresponding amplitude T seconds earlier. The quotient $U_1/U_2$ varies with the decreasing height h in such manner that for large heights it is practically equal to one. The left hand term in the relationship (9) is then smaller than the right hand term and the stated inequality is not fulfilled. When h decreases and approaches O, i.e. when the projectile with the proximity fuse approaches the ground, the quotient $U_1/U_2$ will increase rapidly and at a certain value of $U_1/U_2$ the left hand term will be larger than the right hand term. This occurs at a value of the quotient which is valid for the height $h=H_o$.

Thus the relationship (9) can be utilized for initiating the burst at the desired height $H_o$ if the quotient $U_1/U_2$ is continuously measured and if this quotient is exposed to a signal processing which is represented by the expression $$1/\left(H_o\frac{2}{\lambda T} + f_d\right),$$

where $f_d$ Is the doppler frequency, and if the ignition circuit is triggered when the so obtained signal exceeds $\lambda T/2H_o$. Triggering will then take place at the height $H_o$.

According to the invention this is realized by means of the circuit shown in FIG. 1, where the divider 12 generates a signal of the frequency $f_d$ which has an amplitude corresponding to $U_1/U_2$ if the time delay in the network 14 is made equal to T. The filter 15 delivers a signal corresponding to the left hand part of the relationship (9) if it has a frequency characteristic F for which the ratio between output voltage and input voltage is equal to:

$$F = \frac{1}{f_o + f} \quad (10)$$

where f is the frequency of the input signal, i.e. in the present case equal to the doppler frequency $f_d$, and $$f_o = H_o\frac{2}{T\lambda}$$

Initiation of the burst then will take place at the height $h=H_o$ if the threshold in the threshold circuit is set equal to $\lambda T/2H_o$ and the ignition circuit is initiated when the threshold is exceeded in the threshold circuit.

Figure 2A:
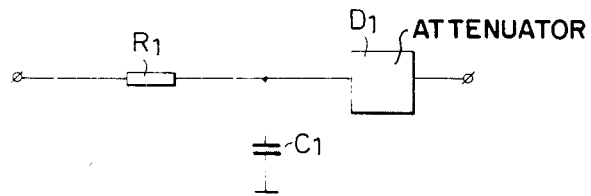
FIGS. 2a and 2b show two embodiments of a filter included in the circuit according to FIG. 1.

Thus the filter 15 should have a frequency characteristic which is approximately equal to $1/(f+f_o)$. A filter which with good approximation has this frequency characteristic within a given frequency range is shown in FIG. 2a. The filter is an RC-filter of first order and consists of a simple RC circuit of low-pass type comprising the resistance R1 and the capacitor C1 of low-pass type followed by an attenuator D1. The frequency characteristic of the filter within the frequency range 10–1000 Hz is shown by the dashed line in FIG. 3a, where the ideal characteristic according to the relationship (10) is shown by a continuous line.

Figure 2B:
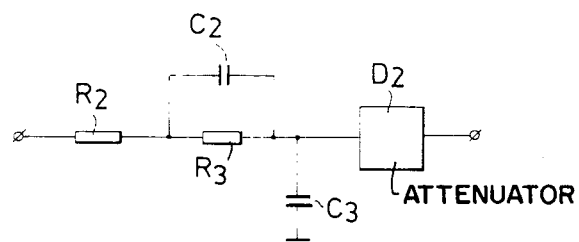

The illustrated coincidence between the frequency characteristics is normally sufficient. However, if a better adaption is desired a filter according to FIG. 2b can be used. Here a filter of second order is shown, which consists of a series circuit comprising the resistance R2 followed by the parallel combination R3, C2 and a parallel branch with the capacitor C3 followed by an antenuator D2. Its characteristic is shown by the dashed and dotted line in FIG. 3b, the continuous line again representing the ideal characteristic.

A simple embodiment of an analogue divider which can be used in the circuit according to FIG. 1 is shown in FIG. 4. Here M designates an analogue multiplier, while O is an operational amplifier and R is an input resistance. The circuit has two input terminals X and Y and one output terminal Z. If the signals at the different terminals are given the same designations as the respective terminal it is easy to prove that $$Z=K(X/Y)$$

Thus in the present case the doppler signal from the sensor unit is applied to the terminal X and the delayed doppler signal to the terminal Y, and the signal at the terminal Z is applied to the filter 15.

The delay circuit 14 in FIG. 1 may for example be realized as an analogue CCD shift register. This results in an idealized delay circuit with a pulse response which is shown in FIG. 5a. It is preferred, however, to use a linear filter having a pulse response according to FIG. 5b. This results in a response which is a delayed average value of the applied signal. In this manner a smoothing effect will be obtained, which makes the system less sensitive to instantaneous disturbances in the detected doppler signal.

In addition to elements shown, there must be means which prevent unintentional triggering when the signal levels are low and the system indefinite. These means may suitably be realized by setting conditions upon the absolute size of the signal levels for triggering. The function represented by the blocks 12-16 in FIG. 1 might easily be realised by a programmed microprocessor.

I claim:

1. A proximity fuse for projectiles, missiles or the like comprising means for transmission of an electromagnetic wave for reflection by an object, which reflected wave is combined with the transmitted wave for generating a doppler signal, which is fed to an ignition circuit via a signal processing circuit, where the dynamic variation of the doppler signal is determined by comparing the prevailing value of the doppler signal with the value of the doppler signal a given time interval previously, characterized in that the signal processing circuit comprises a divider which at one input receives the doppler signal and at a second input receives a delayed version of the doppler signal, and which divider delivers a signal of doppler frequency, the amplitude of which corresponds to the quotient of the prevailing value of the amplitude of the doppler signal divided by the amplitude of the delayed version of the doppler signal, which signal of doppler frequency is fed to the ignition circuit via a filter having a frequency characteristic which is approximately represented by the expression:

$$1/(f+f_o)$$

where $f_o$ is a system parameter and f is the frequency of the input signal, thus equal to the frequency $f_d$ of the doppler signal, triggering of the ignition circuit taking place when the output signal of the filter exceeds a certain level and the constant $f_o$ being so dimensioned in combination with the triggering level that the ignition circuit is triggered at a given distance from the reflecting object.

2. A proximity fuse as claimed in claim 1, characterized in that the filter, which approximates said frequency characteristic, is a filter of first order comprising an RC circuit of lowpass type.

3. A proximity fuse as claimed in claim 1, characterized in that the filter is an RC-filter of second order.

4. A proximity fuse as claimed in claim 1, characterized in that the delayed version of the doppler signal is generated by means of a linear filter of lowpass or bandpass type preceeded by an envelope detector for the doppler signal.

5. A proximity fuse as claimed in claim 2, characterized in that the delayed version of the doppler signal is generated by means of a linear filter of lowpass or bandpass type preceeded by an envelope detector for the doppler signal.

6. A proximity fuse as claimed in claim 3, characterized in that the delayed version of the doppler signal is generated by means of a linear filter of lowpass or bandpass type preceeded by an envelope detector for the doppler signal.

* * * * *